(12) United States Patent
Sun et al.

(10) Patent No.: US 9,361,238 B2
(45) Date of Patent: Jun. 7, 2016

(54) MEMORY ADDRESSING MECHANISM USING A BUFFER OF A HIERARCHY OF COLLISION FREE HASH TABLES

(71) Applicant: Futurewei Technologies, Inc., Plano, TX (US)

(72) Inventors: Yan Sun, Santa Clara, CA (US); Norbert Egi, Santa Clara, CA (US)

(73) Assignee: Futurewei Technologies, Inc., Plano, TX (US)

( * ) Notice: Subject to any disclaimer, the term of this patent is extended or adjusted under 35 U.S.C. 154(b) by 13 days.

(21) Appl. No.: 14/532,874

(22) Filed: Nov. 4, 2014

(65) Prior Publication Data
US 2016/0124864 A1    May 5, 2016

(51) Int. Cl.
| | |
|---|---|
| *G06F 12/00* | (2006.01) |
| *G06F 17/00* | (2006.01) |
| *G06F 12/10* | (2016.01) |
| *G06F 17/30* | (2006.01) |
| *G06F 12/08* | (2016.01) |

(52) U.S. Cl.
CPC ...... *G06F 12/1018* (2013.01); *G06F 17/30949* (2013.01); *G06F 12/0864* (2013.01)

(58) Field of Classification Search
None
See application file for complete search history.

(56) References Cited

U.S. PATENT DOCUMENTS

| | | | | |
|---|---|---|---|---|
| 5,920,900 | A | * | 7/1999 | Poole ............... G06F 17/30949 707/E17.036 |
| 2008/0052488 | A1 | | 2/2008 | Fritz et al. |
| 2013/0086073 | A1 | * | 4/2013 | Lyle ................... G06F 17/3033 707/747 |

FOREIGN PATENT DOCUMENTS

CN    102364463 A    2/2012

OTHER PUBLICATIONS

International Search Report and Written Opinion dated Feb. 1, 2016 in International Patent Application No. PCT/CN2015/093695, 11 pages.

* cited by examiner

*Primary Examiner* — Hal Schnee
*Assistant Examiner* — Craig Goldschmidt
(74) *Attorney, Agent, or Firm* — Futurewei Technologies, Inc.

(57) ABSTRACT

Methods and apparatuses for insertion, searching, deletion, and load balancing using a hierarchical series of hash tables are described herein. The techniques disclosed provide nearly collision free or deterministic hash functions using a bitmap as a pre-filter. The hash functions have different priorities and one hashing result will be used to perform main memory access. For the hash functions, two hash bitmaps are used to store valid data and collision information. There is no collision allowed in the hash tables except for the hash table with the lowest priority. The hash tables and bitmaps may be stored in one or more caches in (e.g., a cache of a CPU, Block RAMs in FPGAs, etc.) which perform much faster than main memory.

20 Claims, 10 Drawing Sheets

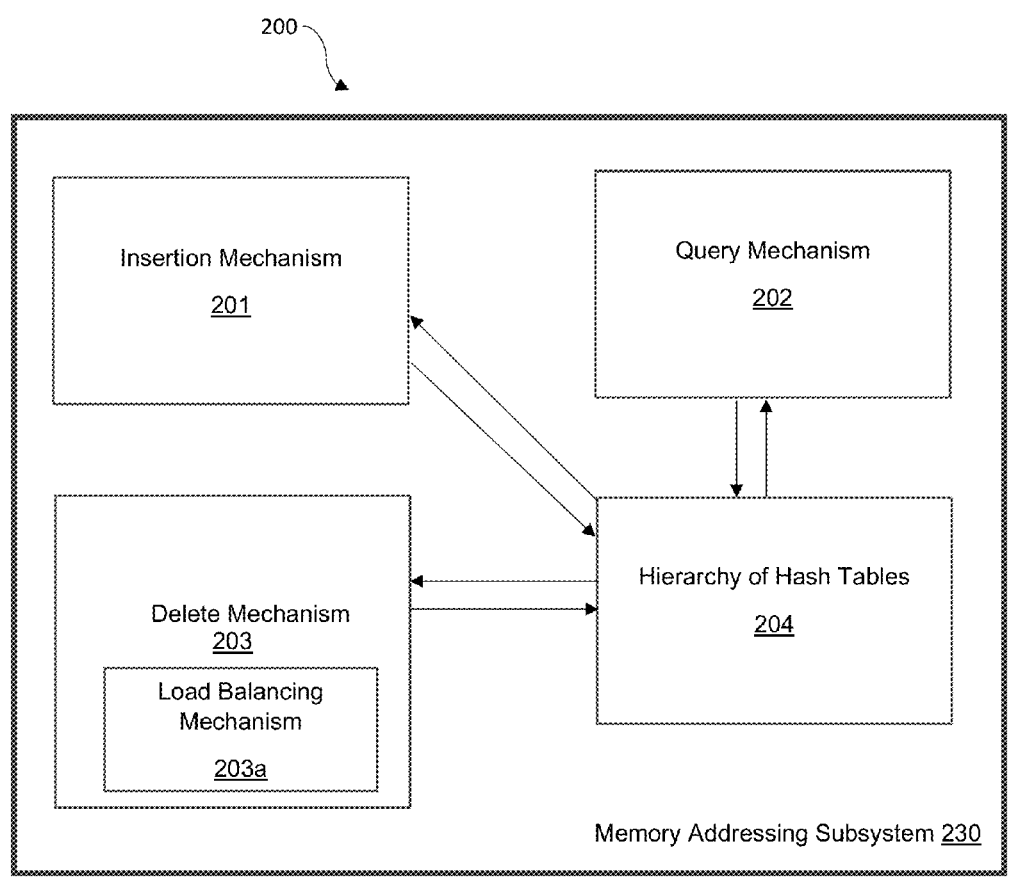
FIG. 2-A

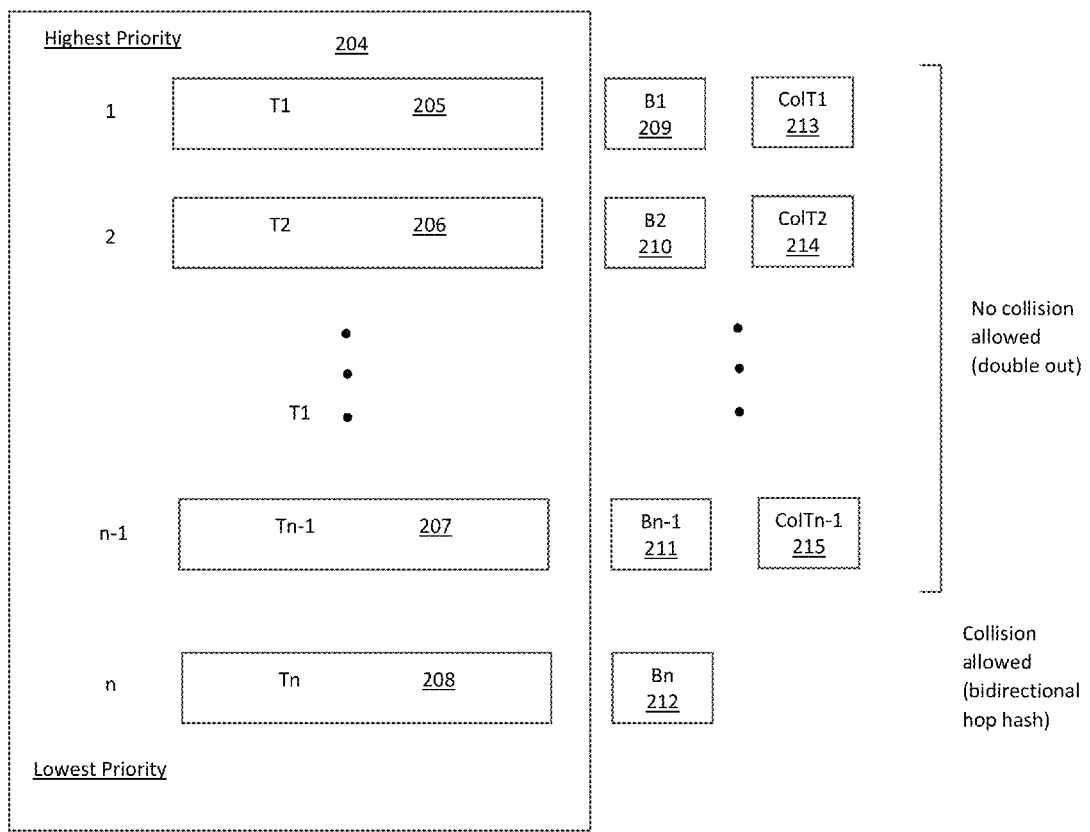
FIG. 2-B

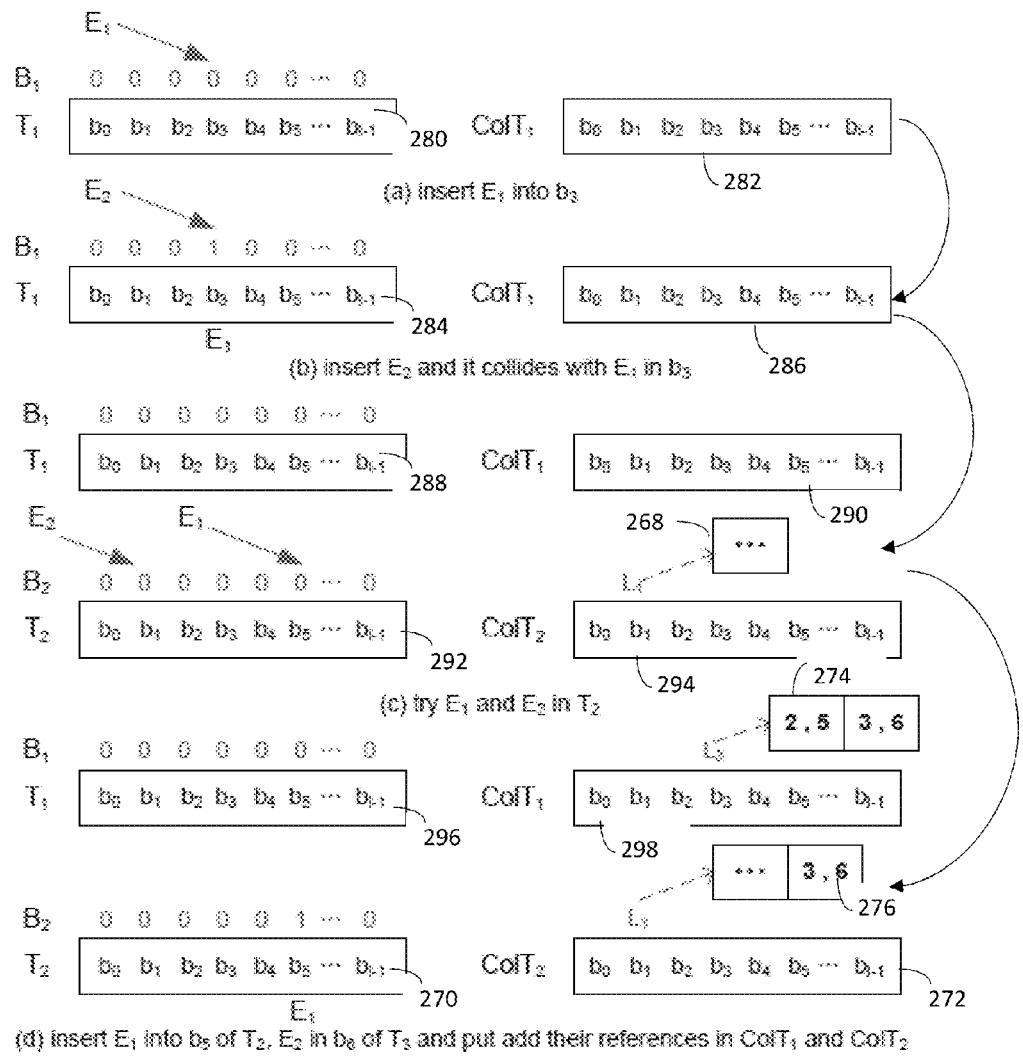
FIG. 2-C

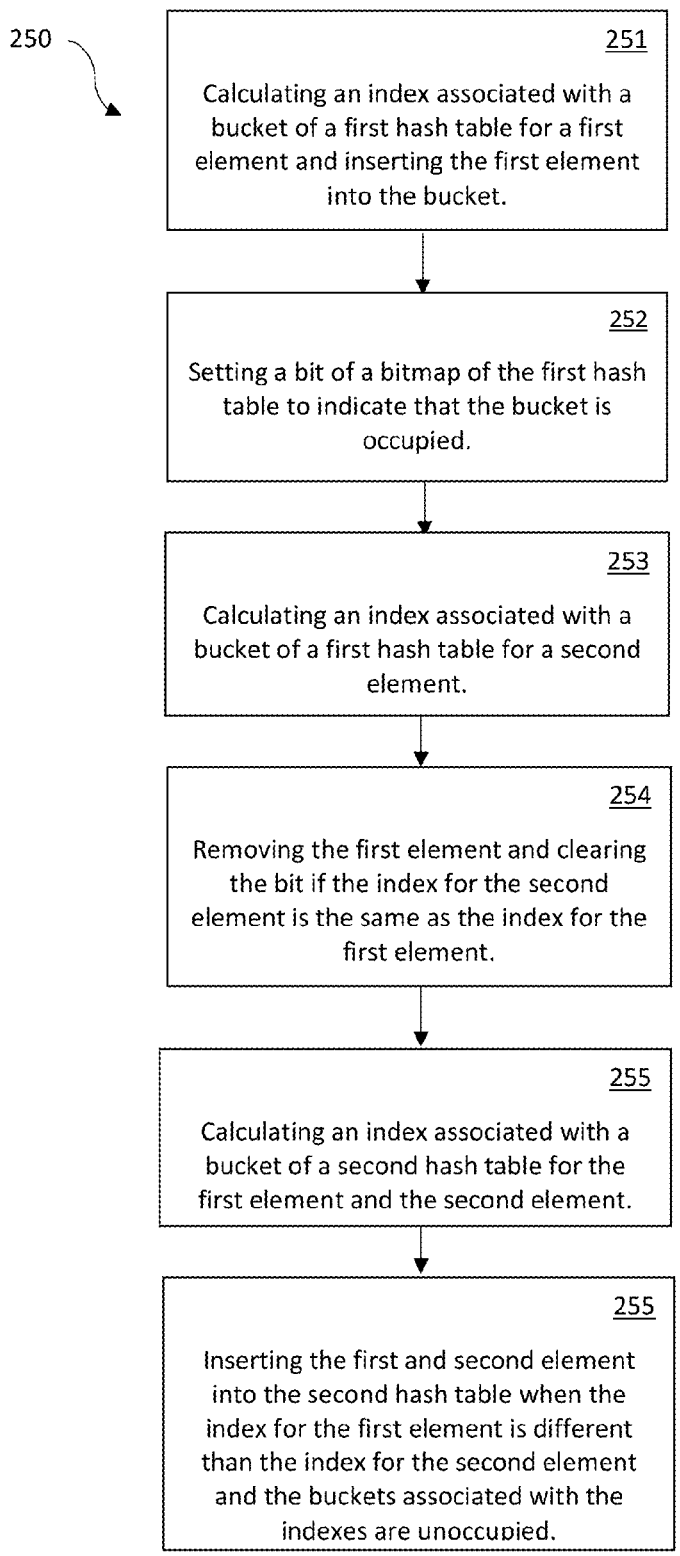
FIG. 2-D

MEMORY ADDRESSING MECHANISM USING A BUFFER OF A HIERARCHY OF COLLISION FREE HASH TABLES

FIELD

Embodiments of the present invention generally relate to the field of memory addressing techniques that utilize hash tables. More specifically, embodiments of the present invention relate to hashing methods for memory addressing using bitmaps where collisions are reduced or eliminated, e.g., used within network systems.

BACKGROUND

Hash tables are widely used in a variety of network applications since they result in constant-time primitive operations such as query, insertion and deletion operations. Hash tables are widely used to store memory addressing information regarding data elements stored in a high capacity storage systems, for example. However, collisions may frequently occur when the table load increases. Newly inserted elements that collide with the existing elements are inserted into additional slots, leading to an increase in the length of the probe sequence used during the query. As a consequence, the cost of primitive operations rises causing degraded performance. While well-known collision resolution policies maintain average performance despite situations having high loads and increased collisions, their performance nevertheless becomes highly non-deterministic.

In modern hardware devices, such as network processors, system performance degrades sharply due to the non-determinism of many hashing techniques. The primary reason is that, in such sophisticated devices, multiple threads are coordinated to accelerate hash operations and therefore synchronization is required because the processing order is critical. Since such synchronization mechanisms ensure that a collection of requests are handled in the same order in which they arrive, the slowest thread unfortunately determines the overall system performance. As the number of threads each having a non-deterministic performance increases, the slowest thread tends to become much slower and the system performance thereby degrades sharply. For such hardware devices, it is critical to maintain a high-degree of determinism through effective collision resolution.

Also, false positives may occur in a multiple-segment hashing system, such as Peacock hashing or FHT. False positives may be classified into two categories. For an element already present in one of the hash tables, the first category of false positive occurs when the element is wrongly reported in some other table(s) by the on-chip Bloom filter. For an element not present in any hash table, the second category of false positive occurs when the element is wrongly reported in one or more hash tables. Peacock hashing and FHT do not discriminate between these two categories of false positives. However, the first category of false positive is of great importance in both theory and practice. A Bloom filter, either a basic one or advanced variants, may never avoid the first category of false positive because it is an approximate summary only in order to save memory. To reduce false positives below 1%, the costly remedy is a 10-bit on-chip memory for every table element. Furthermore, in a high-speed network device such as a router, millions of packets go through every second and the IP address lookup function needs to be performed at wire speed. Even with 1% false positives, tens of thousands of packets are incorrectly matched to routing table entries using a multiple-segment hashing system. This leads to costly and unnecessary probing which also degrades system performance. With increasing network traffic, the problem tends to be worse. From this viewpoint, it is critical to reduce or even remove the first category of false positives.

Many network applications do not need to handle the second category of false positives. For example, IP address lookup forwards incoming packets using routing tables. In a routing table, a special rule, usually with lowest priority, exists to match any packet which does not match other rules. Similarly, packet classification algorithms need to match incoming packets using packet classifiers. The lowest-priority rule in a classifier usually matches any packet since the five fields in the rule are wildcards. Such applications include firewall, access control list operations, etc. Some network applications may temporarily allow the second category of false positive. However dynamic incremental update is used to add the unknown properties in any mismatched item to the database and hence such item may never be skipped a next time. An example is Intrusion Detection System, IDS. If a target packet contains some signature that does not match any rule in the current IDS library, the signature is retrieved and added into IDS library to match packets with the same class of signature.

SUMMARY

Embodiments of the present disclosure provide a memory addressing mechanism with a pre-filter or buffer of nearly collision free or deterministic hash functions each using a bitmap. The collision-free hash functions are hierarchical in that they have different priorities and a hashing result is used to perform main memory access. For each hash function, two hash bitmaps are used to store valid data and collision information. There is no collision allowed in the hash tables except for the hash table with the lowest priority. The bitmaps and hash tables may be stored in a cache (e.g., a cache of a CPU or Block RAM in an FPGA). The hash table of the lowest priority may be a bidirectional hop hash table that allows collisions and the higher level hash tables may be each double-out hash tables that do not allow collisions.

In the following embodiments, methods and apparatuses for nearly collision free and deterministic hashing are provided. In one described approach, a computer system is disclosed having a processor, and a memory unit coupled to the processor, where the memory unit includes a memory addressing subsystem, the memory addressing subsystem including multiple first type hash tables for addressing data, where the multiple first type hash tables is collision-free and arranged in a hierarchy of priority order, where each first type hash table has associated therewith a first table for tracking valid data therein and a second table for tracking collision information. The memory addressing subsystem further includes a second type hash table having a priority below the multiple first type hash tables, the second type hash table allowing collision therein, and a newly presented data element traverses the hierarchy in the priority order and is stored in a highest priority first type hash table having an empty slot corresponding thereto. Otherwise, the newly presented data element is stored in the second type hash table and upon a collision between the newly presented data element and a stored data element of a given first type hash table, both the newly presented data element and the stored data element are evicted from the given first type hash table and presented for storage to hash tables of lower priority than the given first type hash table.

In another described approach, a method for storing an address associated with a data element is disclosed. The method includes accessing a memory subsystem resident in memory, the memory subsystem including multiple first type hash tables for addressing data, where the first type hash tables are collision-free and arranged in a hierarchy of priority order, and where each first type hash table is associated with a first table for tracking valid data and a second table for tracking collision information. The memory subsystem also includes a second type hash table having a priority below that of the first type hash tables, and the second type hash table allows collision therein. The method further includes traversing the newly presented data element through the hierarchy in the priority order, storing the newly presented data element in a highest priority first type hash table having an empty corresponding slot. Otherwise, the newly presented data element is stored in the second type hash table, and upon a collision between the newly presented data element and a stored data element of a given first type hash table, both the newly presented data element and the stored data element are evicted from the given first type hash table and presented for storage to hash tables lower in priority than the given first type hash table.

In a third described approach, a network processor is disclosed having a processor and a cache memory coupled to the processor, the cache memory including multiple first type hash tables for addressing data, the plurality of first type hash tables that is collision-free and arranged in hierarchy of priority order, where each first type hash table has associated therewith a first table for tracking valid data therein and a second table for tracking collision information. The cache memory further includes a second type hash table having a priority below the multiple first type hash tables, the second type hash table allowing collision therein, and a memory unit coupled to the processor, wherein the memory unit comprises instructions that when executed implement a method of accessing data. The method includes calculating indices into the first tables of the plurality of first type hash tables for a data element, using the indices, determining if any of the first tables has an occupancy bit set for the data element, responsive to the determining locating a set occupancy bit, supplying the data element from a first type hash table associated with the set occupancy bit, and responsive to the determining failing to locate a set occupancy bit associated with the hierarchy, providing the data element from the second type hash table.

BRIEF DESCRIPTION OF THE DRAWINGS

The accompanying drawings, which are incorporated in and form a part of this specification, illustrate embodiments of the invention and, together with the description, serve to explain the principles of the invention:

FIG. 2-A is a diagram of an exemplary memory unit of a memory addressing subsystem having software modules for executing insertion, query, and delete operations for a hierarchy of hash tables according to embodiments of the present invention.

FIG. 2-B is a block diagram of an exemplary memory addressing subsystem having a hierarchy of hash tables and bitmap filters and collision tables depicted in decreasing order of priority according to embodiments of the present invention.

FIG. 2-C is a diagram of exemplary hash tables and bitmaps for an insertion operation according to embodiments of the present invention.

FIG. 2-D is a flow chart illustrating an exemplary method of inserting an element into a hash table of a hierarchical series of hash tables according to embodiments of the present invention.

DETAILED DESCRIPTION

Figure 1:
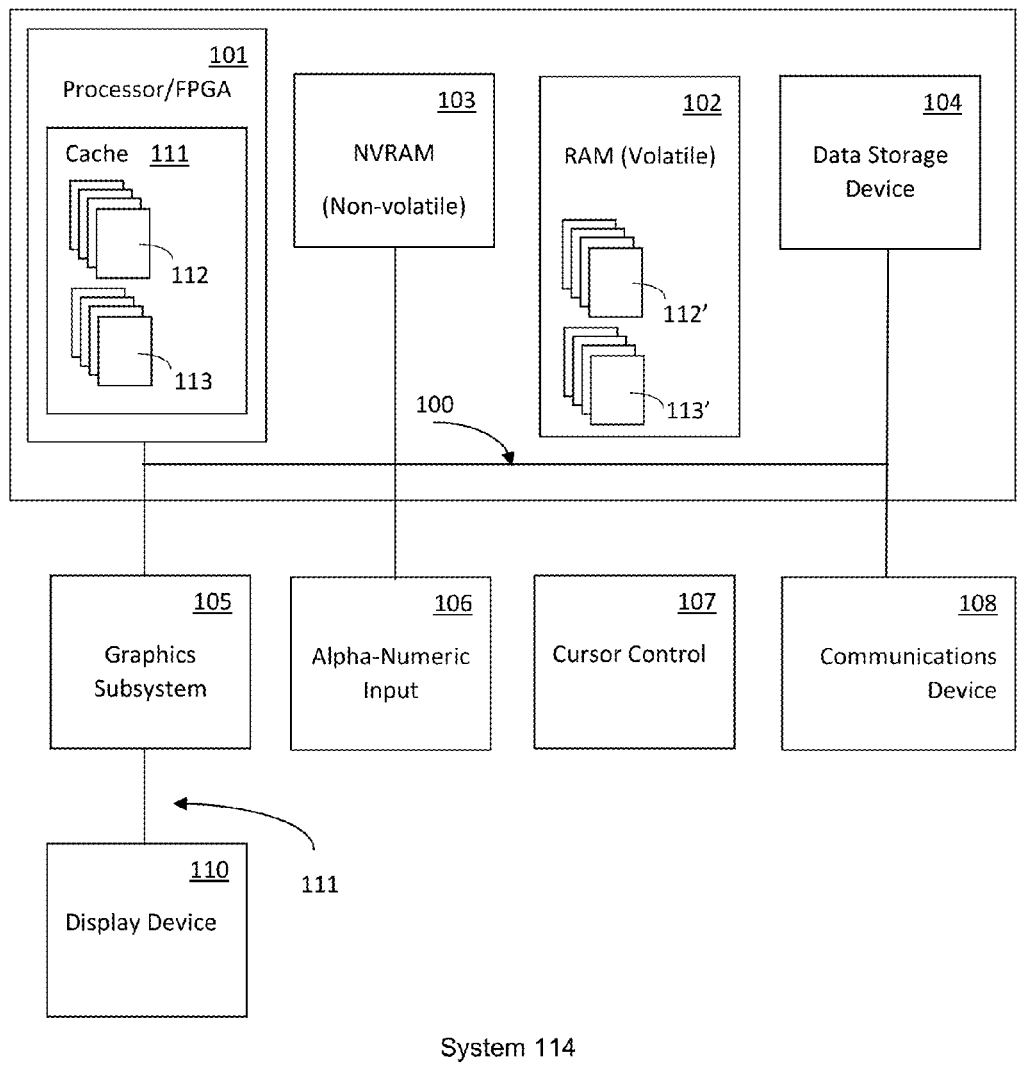
FIG. 1 is a block diagram of an exemplary system architecture upon which embodiments of the present invention may be implemented.

Reference will now be made in detail to several embodiments. While the subject matter will be described in conjunction with the alternative embodiments, it will be understood that they are not intended to limit the claimed subject matter to these embodiments. On the contrary, the claimed subject matter is intended to cover alternative, modifications, and equivalents, which may be included within the spirit and scope of the claimed subject matter as defined by the appended claims.

Furthermore, in the following detailed description, numerous specific details are set forth in order to provide a thorough understanding of the claimed subject matter. However, it will be recognized by one skilled in the art that embodiments may be practiced without these specific details or with equivalents thereof. In other instances, well-known methods, procedures, components, and circuits have not been described in detail as not to unnecessarily obscure aspects and features of the subject matter.

Portions of the detailed description that follows are presented and discussed in terms of a method. Although steps and sequencing thereof may be disclosed in a figure herein describing the operations of this method, such steps and sequencing are exemplary. Embodiments are well suited to performing various other steps or variations of the steps recited in the flowchart of the figure herein, and in a sequence other than that depicted and described herein.

Some portions of the detailed description are presented in terms of procedures, steps, logic blocks, processing, and other symbolic representations of operations on data bits that may be performed on computer memory. These descriptions and representations are the means used by those skilled in the data processing arts to most effectively convey the substance of their work to others skilled in the art. A procedure, computer-executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout, discussions utilizing terms such as "accessing," "writing," "including," "storing," "transmitting," "traversing," "associating," "identifying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Computing devices, such as computer system 114, typically include at least some form of computer readable media. Computer readable media may be any available media that may be accessed by a computing device. By way of example, and not limitation, computer readable medium may comprise computer storage media and communication media. Computer storage media includes volatile and nonvolatile, removable and non-removable media implemented in any method or technology for storage of information such as computer readable instructions, data structures, program modules, or other data. Computer storage media includes, but is not limited to, RAM, ROM, NVRAM, EEPROM, flash memory or other memory technology, CD-ROM, digital versatile discs (DVD) or other optical storage, magnetic cassettes, magnetic tape, magnetic disk storage or other magnetic storage devices, or any other medium which may be used to store the desired information and which may be accessed by a computing device. Communication media typically embodies computer readable instructions, data structures, program modules, or other data in a modulated data signals such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer readable media.

In the example of FIG. 1, the exemplary computer system 114 includes a central processing unit (CPU) 101 having a cache 111 and running software applications and optionally an operating system. According to some embodiments, CPU 101 is a general purpose processor or a network processor. According to some other embodiments, CPU 101 is a field-programmable gate array (FPGA). Memory 102/103 stores applications and data for use by the CPU 101. Storage 104 provides non-volatile storage for applications and data and may include fixed disk drives, removable disk drives, flash memory devices, and CD-ROM, DVD-ROM or other optical storage devices. Bitmaps and hash tables described herein may be stored in cache 111 (e.g., bitmaps 112 and hash tables 113) and/or in RAM 102 (e.g., bitmaps 112' and hash tables 113') and transferred and/or copied between the two, for example, using one or more data buses 100. As described herein, these hash tables are used in a memory addressing subsystem. The optional user inputs 106 and 107 include devices that communicate inputs from one or more users to the computer system 114 and may include keyboards, mice, joysticks, cameras, touch screens, and/or microphones.

Some embodiments may be described in the general context of computer-executable instructions, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

A communication or network interface 108 allows the computer system 114 to communicate with other computer systems via an electronic communications network, including wired and/or wireless communication and including an Intranet or the Internet. The touch sensitive display device 110 may be any device capable of displaying visual information in response to a signal from the computer system 114 and may include a flat panel touch sensitive display. The components of the computer system 114, including the CPU 101, memory 103/102, data storage 104, user input devices 106, and display device 110, may be coupled via one or more data buses 100.

Collision-Free Hashing Method within a Memory Addressing Subsystem

Embodiments of the present disclosure provide a memory addressing mechanism having a nearly collision free or deterministic hash functions using a bitmap as a pre-filter. The hash function and hash tables may be used to store references (e.g., memory addresses) to data elements that are stored in a storage system, for example. The hash functions have different priorities and a hashing result will be used to perform main memory access. For a hash function, two hash bitmaps called a collision table and a bitmap filter are used to store collision information and track valid data, respectively. There is no collision allowed in the hash tables except for the hash table with the lowest priority. Bitmaps and hash tables may be stored in cache 111 (FIG. 1) and/or RAM 102 and transferred and/or copied between the two. Cache 111 may be a cache of a CPU or Block RAM in an FPGA, for example, and generally performs much faster than main memory. According to some embodiments, there is at most one memory access for a query.

In the following embodiments, methods and apparatuses for nearly collision free and deterministic hashing are provided. One technique disclosed herein uses an efficient structure consisting of several hash tables. According to the order of insertion, these hash tables (e.g., tables $T_1$ and $T_2$ of FIG. 2-B) form a hierarchy. A hash table acts as a collision buffer for the hash tables higher up in the hierarchy, where each hash table uses a different hash function to reduce collision probability in different tables. There are two collision resolution mechanisms in the hash tables.

With respect to FIG. 2-A, a memory addressing subsystem 230 of a memory unit 200 (e.g., a memory subsystem, cache, or integrated storage device) is depicted according to embodiments of the present invention. Memory addressing subsystem 230 comprises an Insertion Mechanism 201, a Query Mechanism 202, a Delete Mechanism 203, and a Hierarchy of Hash Tables ("HHT") 204. The memory addressing subsystem 230 may be used to search a hierarchical series of hash tables for a reference to a data element, insert a new reference to a data element into a hierarchical series of hash tables, or delete a reference to a data element from a hierarchical series of hash tables. According to some embodiments, the memory addressing subsystem 230 performs load balancing functions for the series of hash tables. The software modules of memory addressing subsystem 230 may be stored in a memory (e.g., cache 111 or RAM 102) and/or executed using a processor (e.g. processor/FPGA 101). An exemplary Hierarchy of Hash Tables (204) is depicted in FIG. 2-B and discussed in detail throughout the specification. Insertion Mechanism 201 is used to insert new elements into HHT 204. Insertion Mechanism 201 receives data from HHT 204, optionally parses hash table and bitmap information, and sends data to HHT 204 for performing an insertion operation (see Table 1 below). Query Mechanism 202 is operable to query the HHT for a particular element. Query Mechanism 202 sends data to HHT 204 describing an element and receives data from HHT 204 regarding the membership and/or location of the element in HHT 204 (see Table 2 below). Delete Mechanism of memory addressing subsystem 230 also receives hash table and bitmap information from HHT 204. Based on the information received, the Delete Mechanism sends instructions to HHT 204 modifying hash table and bitmap information to delete an element from a hash table. According to some embodiments, Delete Mechanism also contains a load balancing module 203a used for load balancing purposes upon data deletion.

With reference to FIG. 2-B, a novel hash table construction technique using double out hashing and bidirectional hop hashing mechanisms is employed according to embodiments of the present invention. One embodiment requires a small amount of on-chip memory for maintaining an exact summary filter (e.g., a pure bitmap structure). This enables a higher degree of determination, and a hierarchy of hash tables is employed with roughly decreasing sizes in priority order to store elements. To accelerate update operations and achieve load balance, a collection of assistant tables (e.g., collision tables $ColT_1$ and $ColT_2$) are established to track colliding elements in the hash tables.

More specifically, an exemplary hierarchy of hash tables 204 with collision tables and bitmaps is depicted according to embodiments of the present invention. Tables $T_1$ (205), $T_2$ (206), and Tn−1 (207) are associated with a bitmap filter $B_1$ (209), $B_2$ (210), and Bn−1 (211), respectively, to provide rapid membership inspection, and collision tables $ColT_1$ (213), $ColT_2$ (214), and ColTn−1 (215), respectively, to track colliding elements of the hash table. The total number of bits in a bitmap filter is the same as the number of buckets (e.g., slots) in a hash table. The number of buckets, or references, in a collision table is also the same as the number of buckets in a hash table. Tables $T_1$ (205), $T_2$ (206), and Tn−1 (207) do not allow collision.

The last table, Tn (208), uses the bidirectional hop mechanism introduced later using bitmap Bn (212) and allows collision. The tables are depicted in decreasing order of priority, where table T1 has the highest priority, table T2 has the second highest priority, and table Tn has the lowest priority. The dimensions of the tables and the number of tables may be determined by any means, e.g., by a constant value and the input size (e.g., the amount of elements to be inserted). It is important that a hashing technique provide a high-degree of determinism to facilitate various network configurations. For this purpose, embodiments of the present invention limit the length of the maximum probe sequence in a table to 1 and avoid the first category of false positives. The discard rate is reduced because one table (e.g., the table of lowest priority Tn) allows collisions.

In the hierarchy of hash tables, an element is intended to be inserted in the first hash table. If collision occurs at a hash table, the next table in the hierarchy is tried until it is inserted into a hash table without encountering collision. Copies of the element are duplicated in some of the collision tables so that the element may be moved upwards along the table hierarchy for load balancing purpose. The table at the bottom of the hierarchy (e.g., Tn) may use a Bidirectional Hop mechanism. Other than the last table, the tables use a double out mechanism and are associated with a collision table. The double out hash tables are free of collision and have zero false positive for elements present in the hash table. The hash tables in the hierarchy use different hash functions. The techniques disclosed herein enables O(1) query time, and on-chip memory is saved using pure bitmaps for exact summary filters.

According to some embodiments, two principles are described. First, a limited number of elements are maintained in the last table so that on-chip summary filters for the double out hash tables may accelerate a query. Second, given an element, the process starts with the first hash table in the hierarchy. An element is inserted into a next table if it encounters a collision in the higher-level tables along the hierarchy. However the position of the element is not fixed. Under some circumstances, a previously placed element may be moved to a higher-level hash table if it has no collision in the table, e.g., as a result of an element deletion. The last table allows collisions, while the other hash tables remain free of collisions. Thus, the length of a probe is limited to a length of one. In addition, using an on-chip bitmap filter, the double out mechanism reduces the first category of false positive to zero and a high degree of determinism is achieved.

Throughout this disclosure, the variable n represents the number of tables. Ti denotes a table using double out mechanism ($1 \le i \le n-1$). The reference i denotes the level of table Ti in the hash table hierarchy. $T_1$ is on the top level, $T_2$ is on the second level, and so on. Tn denotes the last table of the hierarchy. The reference ci (or cn) represents the dimension of table Ti (or table Tn). Bi bitmap is table Ti's bitmap filter with ci bits. ColTi bitmap denotes table Ti's collision table ($1 \le i \le n-1$) with ci buckets. The reference m denotes the total number of elements in tables and mi (or mn) denotes the number of elements in table Ti (or table Tn). Thus table Ti's load factor is mi/ci. The reference colm denotes the total number of elements in the collision tables and colmi denotes the number of elements in ColTi bitmap. The hash functions used in table Ti (or table Tn) are referred to as hi( ) or hn( ).

Exemplary Hashing Procedure

With regard to FIG. 2-C, an exemplary insertion operation into a double out hash table is depicted according to embodiments of the present invention. The double out mechanism disclosed herein is an open addressed collision resolution policy used in table table Ti (e.g., Table $T_1$ and $T_2$) which has an array of buckets (e.g., $b_0$, $b_1$, $b_2$, etc.). Each bucket stores a pair of values (<index,E>, index) indicating the bucket position that contains the element E. The index value is calculated by applying table Ti's hash function upon E (e.g., hi(E)). Table Ti's bitmap filter Bi (e.g., $B_1$ and $B_2$) maintains a summary of elements present in table Ti. Each bit is associated with a bucket of table Ti. Generally, if the bucket currently contains an element, the bit is set. Otherwise the bit is clear indicating that the bucket is empty. Table Ti's collision table ColTi (e.g., $ColT_1$ and $ColT_2$) maintains references to the colliding elements in table Ti. Each bucket of ColTi bitmap is associated with a bucket of table Ti and tracks references to elements that collide in table Ti. A reference to element E consists of a pair (i,index) to indicate that E is inserted into the position associated with the index of hash table Ti. E may be discarded if it has no reference in any collision table.

Table Ti, Bi bitmap, and ColTi bitmap may be empty initially. For a given element, if its corresponding bit is clear (e.g, a value of zero or not set), it may be inserted into table Ti and the bit is set (e.g. a value of 1). Once two elements collide in table Ti, both are evicted from table Ti and try a next lower priority table (e.g., $Ti_{+1}$, $Ti_{+2}$, or eventually table Tn). $T_{i+1}$ acts as a buffer table for table Ti. References for both elements are stored in ColTi bitmap for tracking, updating and/or load balance purposes. Any update, insert or delete operation may involve several hash tables and collision tables. To query an element, the bitmap filters are referenced and the hash tables having filters that return a positive response are probed. Because a double out mechanism does not allow collision in table Ti, any false positives and false negatives for elements present in tables are eliminated. If no positive response is returned from a filter, the last table Tn is probed. If the given element is present, it is in exactly one table.

Figure 3:
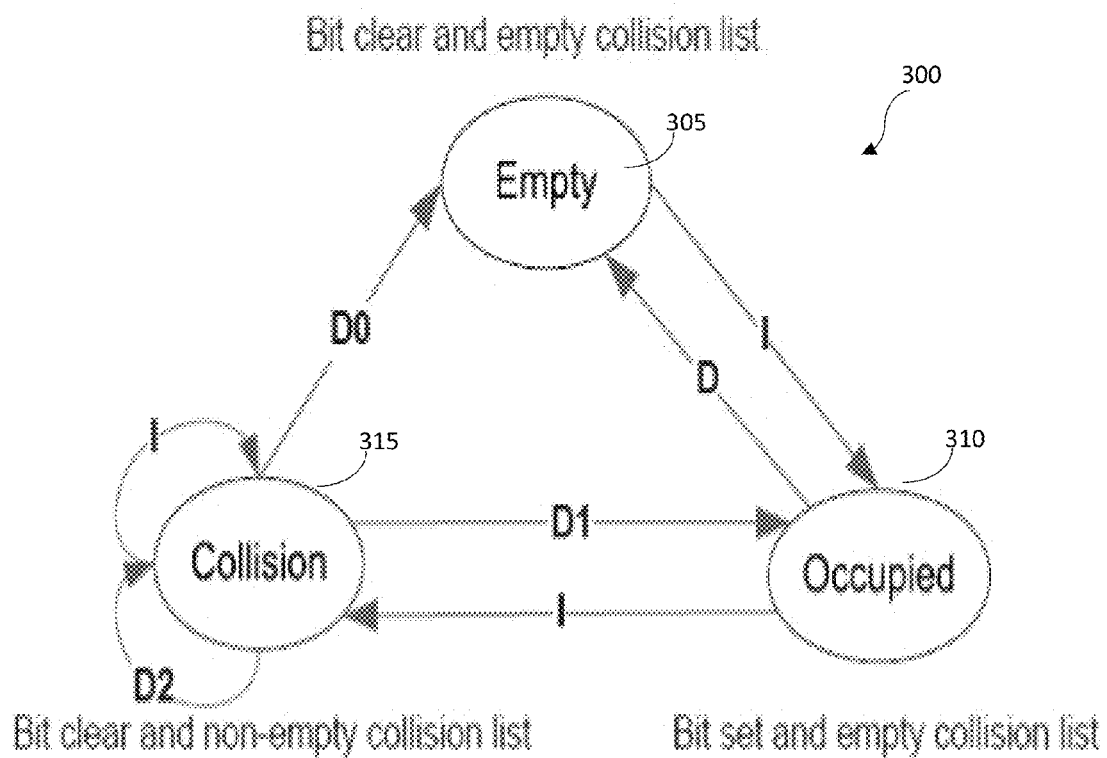
FIG. 3 is a state graph for a bucket of an exemplary bitmap depicted according to embodiments of the present invention.

With reference now to FIG. 3, a state graph 300 for a bucket of an exemplary hash table is depicted according to embodiments of the present invention. The state of a bucket (e.g., bucket $b_1$, $b_2$, etc. of T1 in FIG. 2-C) is important to the operations (e.g., insert or delete) in a double-out hash table. Each of the three circles of graph 300 represents a distinct state, where state 305 is 'Empty,' state 310 is 'Occupied,' and state 315 is 'Collision.' The directed arrows represent an operation that causes a transfer to a different state. Operation I is an insert operation. Operations D, D0, operation D1 and operation D2 are delete operations. A state is indicated by the bucket's associated Bi bit and collision table ColTi. Empty 305, represents an empty bucket with a clear Bi bit and an empty ColTi bitmap. When an element is inserted into the bucket, the state becomes Occupied 310, which indicates that an element is inserted in the bucket. The respective Bi bit is set and the ColTi bitmap remains empty because no collision occurs. If the element is deleted from the bucket, the state of the bit changes from Occupied 310 to Empty 305.

When another element is indexed to an occupied bucket, the first collision occurs and the state of the bucket is changed from Occupied 310 to Collision 315. The existing element in the bucket is removed and the respective bit of Bi is cleared. The ColTi bitmaps (e.g. $ColT_1$ and $ColT_2$) may store references to both elements once they are inserted into lower level hash tables along the hierarchy. If any more elements are indexed to a bucket having a state of Collision 315, the state is maintained and the respective Bi bit remains clear. References to those elements are appended to the ColTi bitmap. Operation D0 indicates that several deletion operations were performed and resulted in an empty ColTi bitmap. Therefore, the state changes from Collision 315 to Empty 305. Operation D2 indicates that after deletion operations a list of ColTi bitmap contains at least two references and the state remains Collision 315.

Operation D1 indicates that after deletion, a list of ColTi bitmap contains one reference. This indicates that the respective element is now free of collision in table Ti. Thus the element is located according to its reference, inserted into table Ti which is in a higher level than its present table, removed from its present table, and its references are removed from corresponding collision tables. The state transfer in case of operation D1 is of special significance to achieve load balance among hash tables, as an element is inserted into the first hash table without collision along the hierarchy. Thus the element had a collision in the higher-level hash tables and its reference is stored in the collision table of these hash tables. Therefore, under some circumstances the element may be moved to a higher-level hash table if it has no collision in the current table.

State transfer graph 300 illustrates that the double out mechanism enables table Ti to remain collision free. Any existing element is constrained to be in either a double out hash table or the last table. As a consequence, the first category of false positives is eliminated. This enables determinism when the embodiment is implemented in hardware such as a network processor.

Operation D1 may be used to move an element due to load balancing. More specifically, when operation D1 occurs, a list of ColTi bitmap contains one reference to an element. That means the element no longer has collision in table Ti. The element may be moved to table Ti from a lower-level table in the hierarchy, and the table Ti's bucket changes its state from Collision to Occupied. References of the elements are removed from corresponding collision tables and other lists having one reference may be processed recursively. Eventually, some elements are moved to higher-level hash tables along the hierarchy such that the load factors in lower-level hash tables decrease to hold more elements. The load factor of the last table Tn is directly related to the discard rate. Moving elements upwards along the table hierarchy may therefor cause a decreasing discard rate. Consequently, the load among tables is balanced by moving those elements referred to in single-reference lists of the collision tables.

Algorithm 1: Insertion Algorithm for a Double-Out Hash Table

Table 1 shows an exemplary algorithm, Algorithm 1, which represents an exemplary insertion procedure for a given input element set. An index for an element is calculated each time an insertion is attempted into a table Ti (e.g., tables $T_1$, $T_2$, and Tn). Three branches in Algorithm 1 correspond to three states: In State 1, a new element is inserted and references are copied to the corresponding collision tables. In State 2, the element in the current bucket is removed. Both elements will traverse the descendant hash table by recursively invoking the same insert function. In State 3, the procedure is similar as in State 2 except that the new element tries the descendant hash table.

TABLE 1

FuncDoubleOutInsert(E[N],$T_i$, $ColT_i$ ) {E[N] (size N) is an input element set}
Initialize an empty array A; {holds elements in collision}
for all E[j] from 1 to N do
  int index == $h_i$(E[j]); {calculate index}
  Bucket b == $T_i$.getBucket(index);
  if b in State 1 then
    $T_i$.insert(index, E[j]); {insert $E_j$}
    for all p from 1 to i − 1 do
      int newIndex = $h_p$(E[j]); {recalculate index}
      $ColT_p$.insert(newIndex,i,index); {insert ref}
  else
  if b in State 2 then
    $T_i$.remove(index,E);
    A.add(E); A.add(E[j]);
    FuncDoubleOutInsert(A, $T_{i+1}$, $ColT_{i+1}$);
  else
    A.add(E[j]);
    FuncDoubleOutInsert(A, $T_{i+1}$, $ColT_{i+1}$);

With reference to FIG. 2-C, exemplary hash tables and bitmaps for an insertion operation are shown based on Algorithm 1. FIG. 2-D illustrates an exemplary sequence of steps for performing an insertion operation based on Algorithm 1. According to the data element insertion process, the index begins from 0, and table $T_1$ (280) and list $ColT_1$ (282) are initially empty. Hash table $T_2$ contains a bucket $b_1$ (subscript as index) in State 3 and the bucket's corresponding list $L_1$ (268) in $ColT_2$ (294) already contains references of two colliding elements. At step 251 of FIG. 2-D, an element $E_1$ is indexed to $b_3$ bucket which is in State 1, and element $E_1$ is inserted into $b_3$ of T1 (280) which is now in State 2. Consequently, at step 252 the fourth $B_1$ bit for table T1 (284) is set. Next, the second element $E_2$ is indexed to $b_3$ and hence collides with $E_1$ at step 253. Reference $b_3$ is now in State 3. $E_1$ is removed from table $T_1$ (288) and the respective $B_1$ bit is cleared at step 254. $E_1$ and $E_2$ are then hashed to table $T_2$ (292) at step 255. $E_2$ and $E_1$ are indexed to b1 in State 3 and $b_5$ in State 1 respectively in table $T_2$ at step 256. E1 is inserted into $b_5$ of table T2 (270). Since $b_1$ in table $T_2$ (296) is in State 3, element $E_2$ is appended to list $L_1$ (268) in ColT$_2$ bitmap (294) and continues to try a next table. $E_2$ is finally inserted into $b_6$ of table $T_3$ (which is not shown). Thus, references to $E_1$ and $E_2$ are <2,5> and <3,6>. Both references are stored in list $L_3$ (274) of ColT$_1$ (298). And $E_2$'s reference is appended to $L_1$ (276) of ColT$_2$ (272) as well. Note that the two bitmaps may be stored in cache memory when searching.

Figure 4:
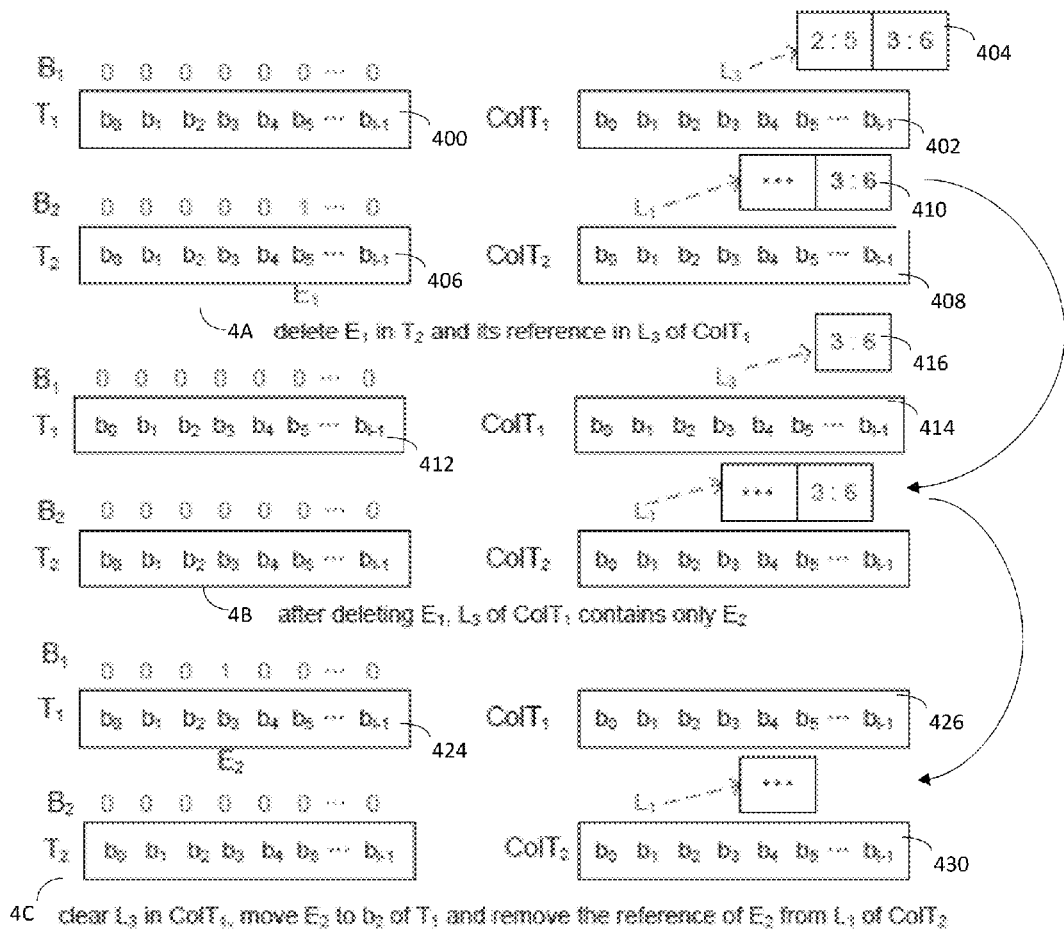
FIG. 4 is a diagram of exemplary hash tables and bitmaps for an exemplary deletion operation involving a double out hash table depicted according to embodiments according to embodiments of the present invention.

With reference to FIG. 4, exemplary hash tables and bitmaps for a deletion operation of a double out hash table are depicted according to embodiments of the present invention. If an element to be deleted is in table $T_1$, it is removed directly. Otherwise, the process removes its references in the collision tables of the hash tables having higher priority than the hash table where the element currently resides. As discussed, deleting references may lead to rebalancing. Rebalancing is a process that includes looking for elements which currently reside in lower-level hash tables along the hierarchy and moving the elements to higher-level hash tables without collision. Rebalancing may be necessary when operation D1 occurs (see FIG. 3) and results in a list of a collision table having one reference, e.g., subject to 1 collision only. The general objective is to maintain elements in the hash table in the hierarchy when no collision is detected. Consequently, the lower-level hash tables maintain low load factors and the discard rate is accordingly reduced.

With regard still to FIG. 4, the status of the hash tables and collision may be represented by the status shown in FIG. 3 (e.g., Empty 300, Occupied 310, and Collision 315) after the insertions are performed. Steps 4A, 4B, 4C are performed in sequence. $E_1$ is in bucket $b_5$ of table $T_2$ (406) while table $T_1$ (400) is empty. List $L_3$ (404) in ColT$_1$ (402) contains references to $E_1$ and $E_2$. List $L_1$ (410) in ColT$_2$ (408) contains references to $E_2$ and two other elements. $E_2$ is now in $b_6$ of $T_3$ which is not shown for clarity. Data element $E_1$ is intended to be deleted. At step 4A of FIG. 4, E1 is to be deleted from $T_2$ (406) along with the reference in ColT$_1$ (402). Proceeding to step 4B, after deleting $E_1$, $L_3$ (416) in ColT1 (414) contains one reference to $E_2$ which should be moved to $b_3$ of $T_1$ (412). Therefore, at step 4C, $E_2$ is inserted into $b_3$ of $T_1$ (424) and $E_2$'s references are removed from ColT$_1$ (426) and ColT$_2$ (430). In this example, the deletion produces a list having one reference.

It is appreciated that, in accordance with the memory addressing subsystem described herein, as new insertions cause possible collisions and push elements to lower-level tables along the hierarchy, deletion operations reduce collisions and pull elements up to higher-level tables. Load balance is thus achieved as a consequence of deleting elements and/or rebalancing the tables.

Figure 5:
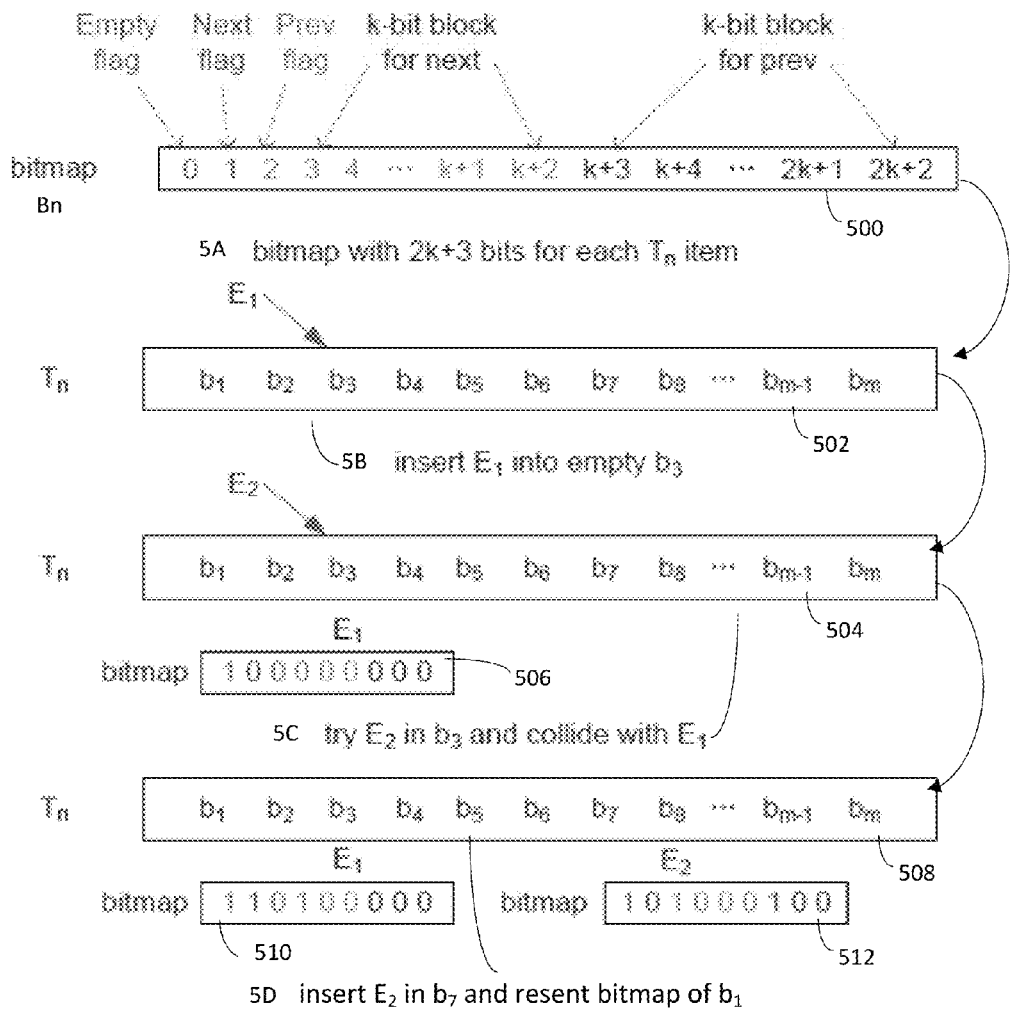
FIG. 5 is a diagram of exemplary hash tables and bitmaps for an exemplary bidirectional hop technique depicted according to embodiments of the present invention.

With regard to FIG. 5, exemplary hash tables and bitmaps for a bidirectional hop technique are depicted according to embodiments of the present invention. If a newly presented data element does not locate a vacant bucket within the collision-free hash tables, then it is presented to the bi-directional hop hash table $T_n$. The bidirectional hop technique is an open addressed collision resolution policy used in hash table $T_n$, the bottom-level hash table in the hierarchy. In other words, the bottom-level hash table is used to store a new element when the higher level hash tables (e.g., $T_1 \ldots T_{n-1}$) each resulted in a collision. The mechanism allows a colliding element to be inserted into the second place which is found using bidirectional probing. When an element is indexed into a bucket in $T_n$, it is either inserted or discarded. If current bucket is empty, it is inserted. Otherwise the probing process attempts to find another empty bucket. If found, the element is inserted and a connection between these two buckets is constructed. $T_n$ is a table in the hierarchy that allows collision.

The mechanism has the same neighborhood property as "Hopscrotch" hashing where the cost of finding the desired element in any of the buckets in the neighborhood is the same or very close to the cost of finding it in the bucket itself. However, a difference from Hopscotch hashing is that bidirectional hop mechanism does not displace any elements. A binary bitmap is associated with each bucket to encode collision information. In one embodiment, the size of the bitmap is 2 k+3 bits wherein k is a parameter to determine the probing distance.

An exemplary Bn bitmap (500) is depicted in FIG. 5 according to embodiments of the present invention. From left to right, the first bit of Bn indicates whether the bucket is empty; it is set if the bucket is occupied by an element. The second bit of Bn bitmap indicates whether the element in current bucket has a colliding element, or a next hop. If it is set, the k bits for the next hop (e.g., k-bit block for 'Next' in Bn bitmap (500)), are used to encode the relative distance from the next hop. The third bit of Bn indicates whether the element in the current bucket is a next hop of another element, or a previous hop. If it is set, the k bits for the previous hop (e.g., k-bit block for 'Prev' of FIG. 5), are used to encode the relative distance from previous hop.

For instance, data element $E_1$ may be inserted into an empty bucket $b_p$, and the first bitmap bit is set. If an element $E_2$ is also indexed into $b_p$, it collides with $E_1$. Next, the probing process may find an empty bucket $b_q$. $E_2$ is inserted and the relation between $E_1$ and $E_2$ is constructed by setting their bitmaps. First, $b_p$'s next hop is established by setting the second bit and encoding the k-bit block for 'Next' with the relative distance p-q. The first bitmap bit of $b_q$ is then set. It is understood that $b_q$'s previous hop is established by setting the third bit and encoding the k-bit block for 'Prev' with the same relative distance p-q. Therefore, the second bit and the k-bit block for 'Next' collectively act as the pointer to the next hop, and the third bit and the k-bit block for 'Prev' act as the pointer to the previous hop.

Under some situations, an element is discarded when it is indexed to a bucket. In one example, the second bit is set in the bucket's bitmap. This indicates that there is already a next hop for the current bucket and no more elements are allowed. Otherwise, the probing process does not locate an empty bucket. Therefore, the increasing number of next hops boosts the discard rate. Thus, when an element is deleted from a bucket, its next hop is transferred back to the bucket so that the discard rate is reduced for new insertions. The previous hop is recorded for the purpose of transferring a next hop back to a block. This enables load balance to be achieved in Tn.

The probing process works as follows. The probing scope is limited to a predefined number of, e.g. 2 k in one embodiment, adjacent positions around a current bucket, referred to as $b_p$. The probing is performed bi-directionally from $b_p+1$ to $b_p+2^{\wedge}(k-1)$ and then from bp-1 to $b_p-2^{\wedge}(k-1)$. Once an empty bucket is found, the probing process ends. For example, when k is 4, the probing scope for a bucket $b_9$ includes interval [$b_1$, $b_8$] and [$b_{10}$, $b_{17}$], both inclusively. Linear probing is performed in each interval from $b_{10}$ to $b_{17}$ and $b_8$ to $b_1$.

In regard to the exemplary insertion operation depicted in FIG. 5, k=3 and the buckets other than $b_4$, $b_5$, $b_6$ are empty at step 5A. At step 5B, an element E1 is indexed to $b_3$ of Tn (502). At step 5C, $b_3$ updates its bitmap by setting the first bit to 1 (506). Another element $E_2$ is indexed to $b_3$ of Tn (504) as well and collides with $E_1$. At step 5D, the probing process searches from $b_4$ to $b_7$ and returns $b_7$ as the first empty bucket it found. Data element $E_2$ is inserted into $b_7$. Now $b_3$ is $b_7$'s previous hop and $b_7$ is $b_3$'s next hop. Therefore the second bit in $b_3$'s bitmap (510) is set for next hop indication and the k-bit block for next is encoded with the relative distance 4 (011 in binary), because 7−3=4. Likewise, the first and third bits in $b_7$'s bitmap (512) are set to indicate a non-empty bucket and a previous hop. The k-bit block for 'Prev' is encoded with the same relative distance. Deleting an element without a next hop may be performed by clearing the first bit in the bucket's bitmap. Deleting an element with a next hop involves moving the next hop back to the bucket the element resides.

Figure 6:
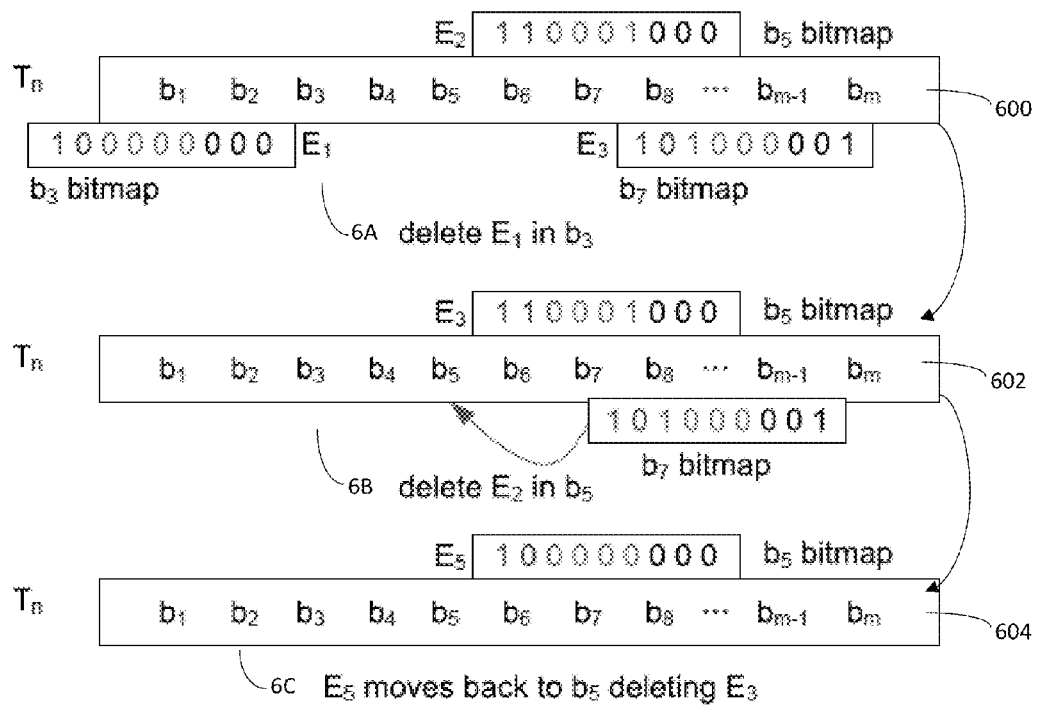
FIG. 6 is a diagram of exemplary hash tables and bitmaps for an exemplary deletion procedure according to embodiments of the present invention.

FIG. 6 depicts exemplary hash tables and bitmaps for a deletion procedure according to embodiments of the present invention. In this example, k is 3 and Tn contains three elements, $E_1$, $E_2$ and $E_3$ which are in buckets $b_3$, $b_5$ and $b_7$ respectively. $E_3$ collides with $E_2$ and therefore $b_7$ is $b_5$'s next hop and their bitmaps reflect this relationship. At step 6A, data element $E_1$ is intended to be deleted from table Tn (600). At step 6B, $E_1$ is deleted from table Tn (602) and $b_3$'s bitmap is not shown because it is empty. Next $E_2$ is intended to be deleted and step 6C shows the result for table Tn (604). To delete $E_2$, move $E_3$ back to $b_5$ and clear $b_7$. $b_5$'s bitmap reflects the change by clearing the second bit and the k-bit block for 'Next'. Such a move-back strategy for next hops after deletions improves the load for Tn and reduces the discard rate. As long as a moderate k value is chosen, a cache line may hold an element and its next hop. As a result, looking up an element using the bidirectional hop mechanism requires one hash access. This eliminates the disadvantage of "Cuckoo" hashing or linear hashing where access sequences of unrelated locations on different cache lines is required.

Algorithm 2: Data Query Procedure.

Figure 7:
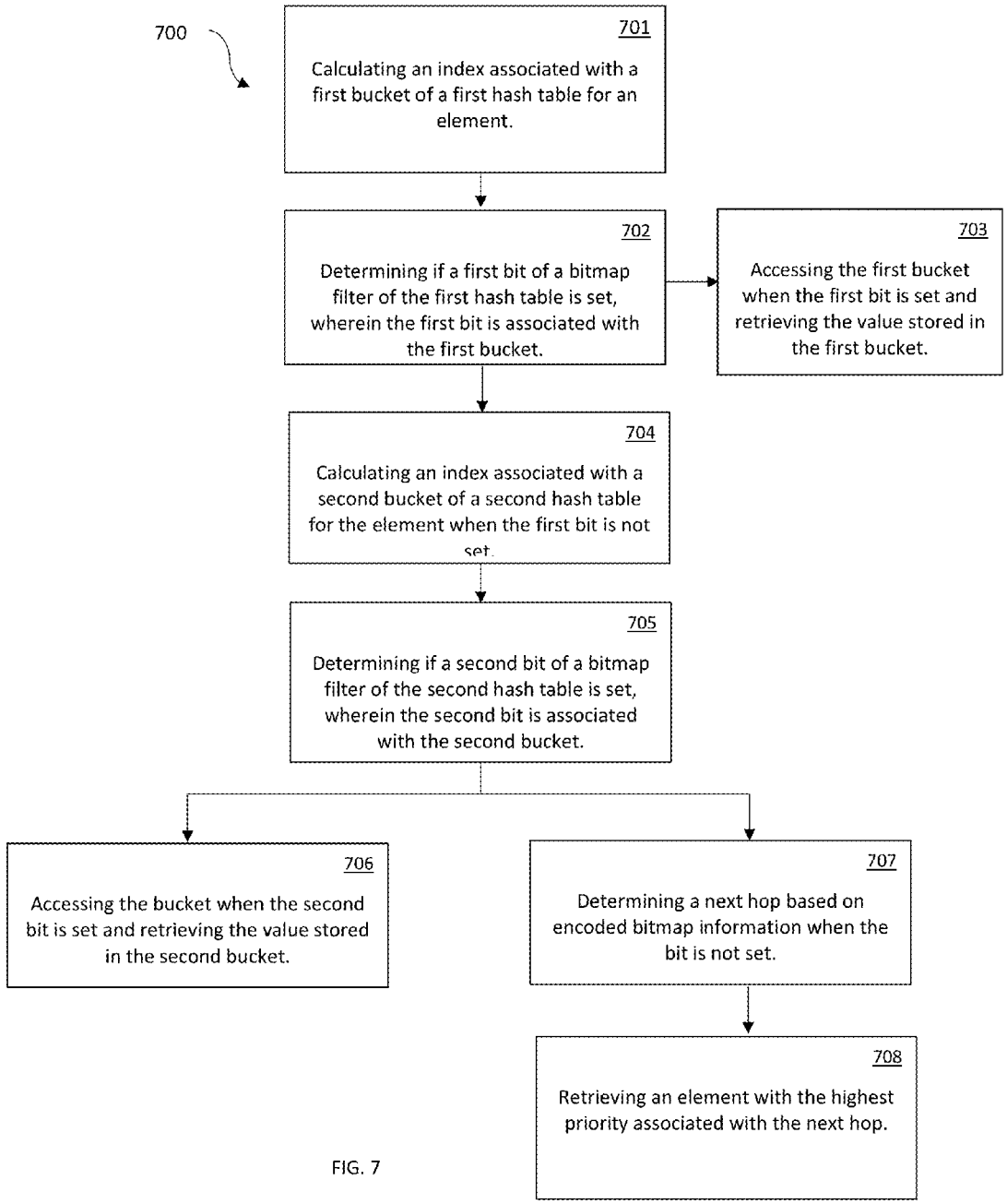
FIG. 7 is a flow chart illustrating an exemplary method of searching a hierarchical series of hash tables for an element according to embodiments of the present invention.

With regard to FIG. 7, an exemplary sequence of computer implemented steps 700 for searching for an element in a series of hash tables is depicted according to embodiments of the present invention. Table 2 illustrates exemplary pseudo code of a query. To query a given element data element E, the on-chip bitmap filters are first inspected. E's index idx for Ti is calculated by hi(E) at step 701. For each bitmap filter Bi, it is determined if the bit position idx in Bi is set (see Table 2) at step 702. If it is set, a positive response is received from Bi. The on-chip filter inspections may be performed in parallel in one embodiment.

Due to the double out mechanism, the first category of false positive for elements present is 0. In other words, there is at most one positive response from the bitmap filters. The respective bucket is accessed and the value is retrieved at step 703. In the case of no positive responses, the last table Tn is searched. To query data element E in Tn, the index using hn(E) is calculated at step 704. At step 705, it is determined if the respective bit of the bitmap filter is set. If the element is located, at step 706, the respective bucket is accessed and the value is retrieved. If the element is not in the bucket, a determination is made whether a next hop is available. If so, the encoded bitmap information is used to check the next hop at step 707. When there is more than one match found, the match result with the highest priority is selected at step 708.

Using this approach, false positive are eliminated in the bitmaps and a query is performed in a highly deterministic manner. The double out mechanism guarantees that table Ti is free of collisions. A bidirectional hop mechanism enables a single cache-line access to Tn. Pure bitmap filters reduce the first category of false positive to 0. Collectively these techniques enable a high degree of determinism in hardware implementations such as network processors or FPGAs.

TABLE 2

```
FuncQuery(E)
    for all i from 1 to n − 1 do
    int idx = h_i(E); {calculate index}
    if B_i.idx == 1 then
    return i and idx;
    int idxLast = h_n(E); {calculate index for T_n}
    return T_n.lookup(idxLast);
```

Embodiments of the present invention are thus described. While the present invention has been described in particular embodiments, it should be appreciated that the present invention should not be construed as limited by such embodiments, but rather construed according to the following claims.

What is claimed is:

1. A computer system comprising:
a processor; and
a memory unit coupled to said processor, wherein said memory unit comprises a memory addressing subsystem, said memory addressing subsystem comprising:
a plurality of first type hash tables for addressing data, wherein said plurality of first type hash tables is collision-free and arranged in a hierarchy of priority order, wherein each first type hash table has associated therewith: a first table for tracking valid data therein; and a second table for tracking collision information; and
a second type hash table having a priority below said plurality of first type hash tables, said second type hash table allowing collision therein, and
said memory addressing subsystem operable wherein a newly presented data element traverses said hierarchy in said priority order and is stored in a highest priority first type hash table having an empty slot corresponding thereto, otherwise, said newly presented data element is stored in said second type hash table and, wherein further, upon a collision between said newly presented data element and a stored data element of a given first type hash table, both said newly presented data element and said stored data element are evicted from said given first type hash table and presented for storage to hash tables of lower priority than said given first type hash table.

2. The computer system as described in claim 1 wherein said first type is a double out hash type hash table and wherein said second type is a bi-directional hop hash type hash table.

3. The computer system as described in claim 1 wherein each first type hash table comprises a plurality of slots for storage of data elements and, wherein further, an associated first table comprises a respective bit for each slot of said plurality of slots for indicating slot occupancy and, wherein further, an associated second table comprises a respective reference for each slot of said plurality of slots for indicating collision information.

4. The computer system as described in claim 3 wherein said collision information comprises identifications of storage locations of data elements associated with a collision.

5. The computer system as described in claim 3 wherein each slot of said plurality of slots exists in a state which is one of: an empty state, an occupied state and a collision state.

6. The computer system as described in claim 5 wherein each bit of said first table is settable to a first value to indicate an occupied state and is settable to a second value to indicate either a collision state or an empty state.

7. The computer system as described in claim 1 wherein, upon deletion of a data element from a given slot of a first type hash table that indicates a single collision, a corresponding data element of a lower priority hash table is moved into said given slot for load balancing.

8. The computer system as described in claim 1 wherein each first type hash table of said plurality of first type hash tables comprises a different hash function.

9. A method for storing an address associated with a data element comprising:
   accessing a memory subsystem resident in memory, said memory subsystem comprising:
   a plurality of first type hash tables for addressing data, wherein said plurality of first type hash tables is collision-free and arranged in a hierarchy of priority order, wherein each first type hash table has associated therewith: a first table for tracking valid data therein; and a second table for tracking collision information; and
   a second type hash table having a priority below said plurality of first type hash tables, said second type hash table allowing collision therein;
   traversing said newly presented data element through said hierarchy in said priority order;
   storing a newly presented data element in a highest priority first type hash table having an empty slot corresponding thereto, otherwise, storing said newly presented data element in said second type hash table; and
   upon a collision between said newly presented data element and a stored data element of a given first type hash table, evicting both said newly presented data element and said stored data element from said given first type hash table and presenting them for storage to hash tables lower in priority than said given first type hash table.

10. The method as described in claim 9 wherein said first type is a double out type hash table and wherein said second type is a bi-directional hop hash type hash table.

11. The method as described in claim 9 wherein each first type hash table comprises a plurality of slots for storage of data elements and, wherein further, an associated first table comprises a respective bit for each slot of said plurality of slots for indicating slot occupancy and wherein further an associated second table comprises a respective reference for each slot of said plurality of slots for indicating collision information.

12. The method as described in claim 11 wherein said collision information comprises identifications of storage locations of data elements associated with a collision.

13. The method as described in claim 11 wherein each slot of said plurality of slots exists in a state which is one of: an empty state, an occupied state and a collision state.

14. The method as described in claim 13 wherein each bit of said first table is settable to a first value to indicate an occupied state and is settable to a second value to indicate either a collision state or an empty state.

15. The method as described in claim 9 wherein said method further comprises performing loading balancing by moving data elements from lower priority first type hash tables to higher priority first type hash tables responsive to deletions that create vacancies within said hierarchy for said data elements.

16. The method as described in claim 15 wherein said moving comprises upon deletion of a data element from a given slot of a first type hash table that indicates a single collision, moving a corresponding data element of a lower priority hash table into said given slot.

17. The method as described in claim 9 wherein each first type hash table of said plurality of first type hash tables comprises a different hash function.

18. A network processor comprising:
   a processor having a cache memory, said cache memory comprising:
   a plurality of first type hash tables for addressing data, said plurality of first type hash tables that is collision-free and arranged in hierarchy of priority order, wherein each first type hash table has associated therewith: a first table for tracking valid data therein; and a second table for tracking collision information; and
   a second type hash table having a priority below said plurality of first type hash tables, said second type hash table allowing collision therein; and
   a memory unit coupled to said processor, wherein said memory unit comprises instructions that when executed implement a method of accessing data, said method comprising:
   calculating indices into said first tables of said plurality of first type hash tables for a data element;
   using said indices, determining if any of said first tables has an occupancy bit set for said data element; and
   responsive to said determining locating a set occupancy bit, supplying the data element from a first type hash table associated with said set occupancy bit; and
   responsive to said determining failing to locate a set occupancy bit associated with said hierarchy, providing the data element from said second type hash table.

19. The network processor of claim 18 wherein said determining comprises searching through said first tables in parallel.

20. The network processor of claim 18 wherein said first type is a double out type hash table and wherein said second type is a bi-directional hop hash type hash table and wherein further said providing the data element from said second type hash table comprises performing bi-directional hash hoping processes to locate said data element within said second type hash table.

* * * * *